Jan. 21, 1936.  L. H. SPERRY  2,028,419
APPARATUS FOR THE CONTINUOUS TREATMENT OF FIBROUS MATERIALS
Filed May 31, 1934   2 Sheets-Sheet 2

WITNESS:

INVENTOR
Luke H. Sperry
BY
ATTORNEYS.

Patented Jan. 21, 1936

2,028,419

UNITED STATES PATENT OFFICE 2,028,419

APPARATUS FOR THE CONTINUOUS TREATMENT OF FIBROUS MATERIALS

Luke H. Sperry, Hopewell City, Va., assignor to Hercules Powder Company, Wilmington, Del., a corporation of Delaware Application May 31, 1934, Serial No. 728,300

4 Claims. (Cl. 92—7)

This invention relates to an apparatus for the continuous treatment of fibrous materials, as, for example, cotton linters, straw, wood, jute, or the like.

In the preparation of fibrous materials for various purposes, it is often desired to effect removal from the materials of hull particles or ligneous impurities, to effect saponification of the oils and emulsification of the waxes, etc., and for certain purposes, as in the preparation of cellulose linters for nitration, it is desirable to effect a reduction in the viscosity of these materials.

Such purification treatment is usually accomplished by the so-called cooking of the materials in a large quantity of aqueous caustic soda solution or of sulfate liquor or other purifying solution. It is desirable that this purification treatment, which involves heating the fibrous materials with the purifying solution under pressure, be conducted in a continuous manner. It is accordingly the purpose of this invention to provide apparatus suitable for the continuous purification or other treatment of fibrous materials under heat and pressure.

United States Patent No. 1,856,453 to Thomas W. Bacchus shows apparatus suitable for the continuous purification of fibrous materials. However, this apparatus is not entirely satisfactory since in the operation of the discharge valve shown therein various difficulties are encountered in handling the suspension of fibrous material, especially when the tower or standpipe for the maintenance of back-pressure shown in this patent is not used and the valve has to discharge at atmospheric pressure. It is accordingly a purpose of this invention to provide an improved form of discharge valve which is adapted to receive a liquid carrying fibrous material suspended therein at a high pressure and to discharge this suspension at a much lower pressure.

The general nature and purpose of the invention having been described, a more detailed description of specific apparatus in accordance with this invention will be given with reference to the accompanying drawings, in which—

Figure 1:
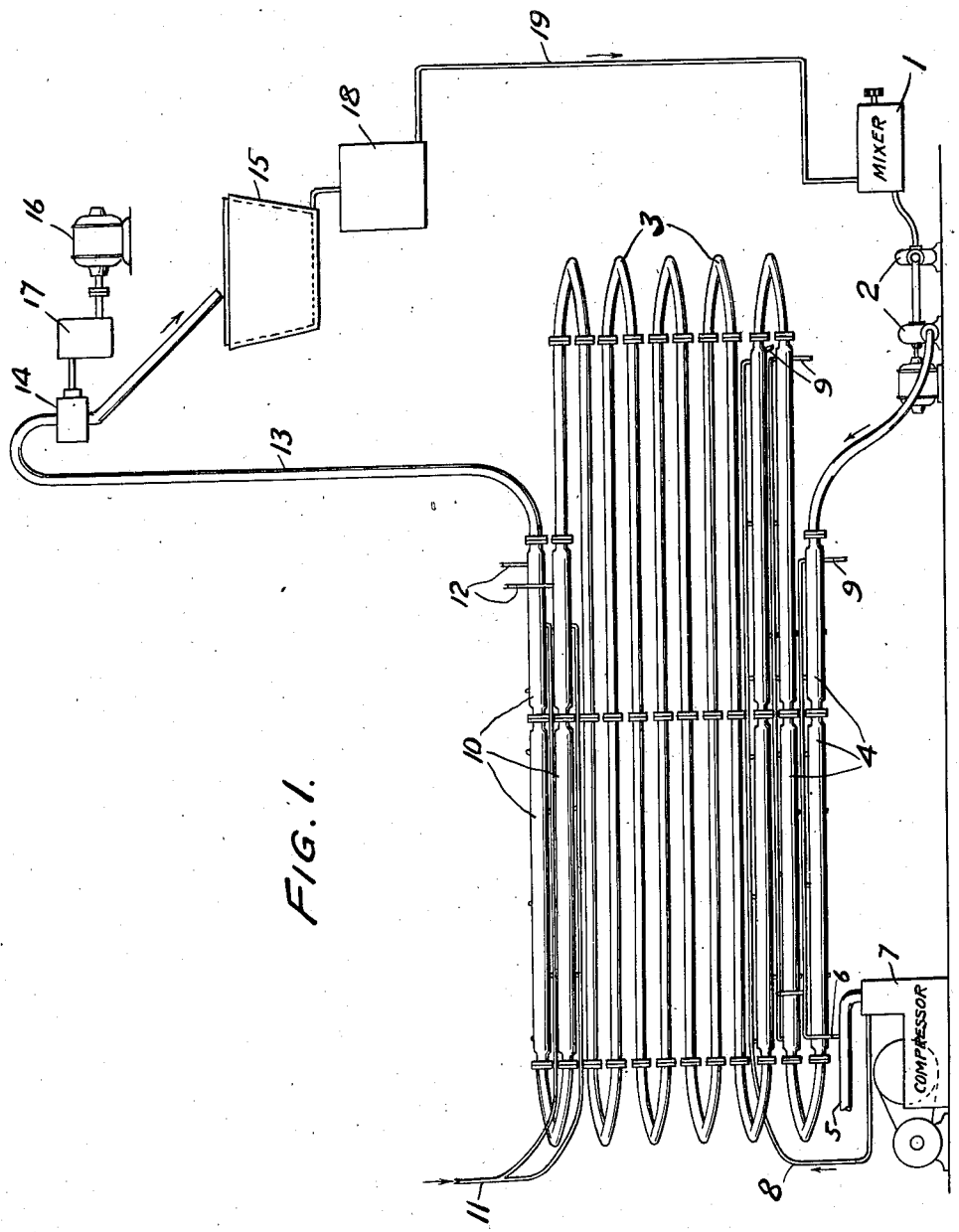
Figure 1 is a diagrammatic representation of apparatus for the continuous treatment of fibrous materials.

With reference to Figure 1: I represents a mixing device for thoroughly mixing the fibrous material with the purifying liquid. The mixing device may be, for example, a Hollander beater. 2 represents centrifugal pumps which receive the suspension of fibrous material from the mixer and pass it into the lower portion of the treating coil 3. This lower portion of the treating coil 3 is provided with jackets 4 for the circulation of steam or other heating medium. As shown in Figure 1, the steam jackets on the lowermost coils may be provided with low pressure steam through pipes 5 and 6, while the jackets on the remaining lower coils may be provided with high pressure steam through pipe 8 from the steam compressor 7. All the steam jackets, however, may be provided with either high or low pressure steam from any suitable source. The spent steam is discharged from the jackets 4 through the outlets 9.

The intermediate portions of the coil 3 may be left unjacketed or may be jacketed with an asbestos or other insulating coating. The uppermost portions of the coil 3 are provided with jackets 10 for the circulation of water or other cooling medium. The cooling medium enters through pipe 11 and is discharged through pipes 12. From the coil 3 the suspension of fibrous material passes through pipe 13 and through the rotary discharge valve 14, the construction of which will be hereinafter described, into container 15. The rotary discharge valve 14 is driven by an electric motor 16 through a speed reducer 17. The container 15 is provided with perforate walls and bottom through which the spent purifying liquid may drain into tank 18. The recovered purifying liquid in tank 18 after fortification, if necessary, may be passed back into the mixer 1 through pipe 19. The fibrous material remaining in container 15 may be removed for batch washing or for such other final purification treatment as may be necessary.

Figure 2:
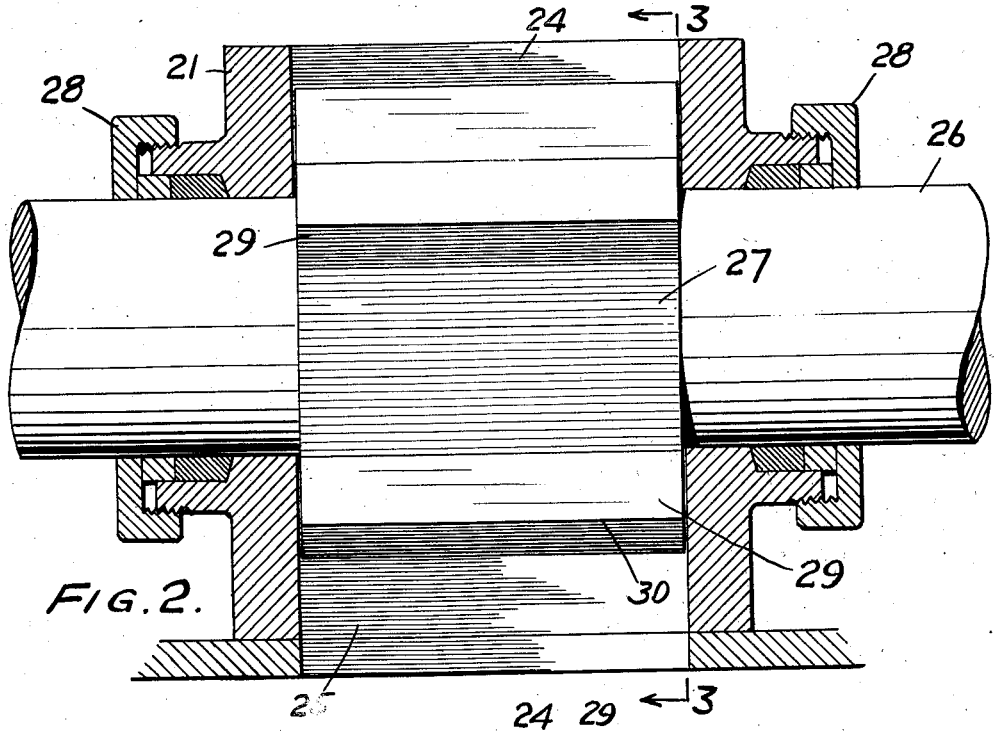
Figure 2 is a detail sectional view of the rotary release valve in accordance with this invention.
Figure 3:
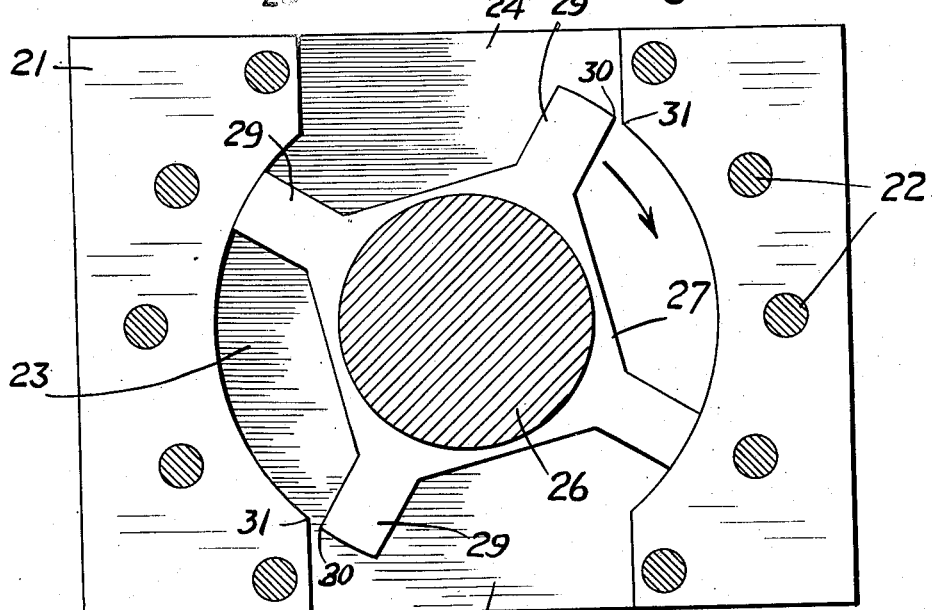
Figure 3 is a detail sectional view of the same rotary release valve taken on the plane 3—3 of Figure 2.

The rotary discharge valve 14 comprises, referring to Figs. 2 and 3, a casing 21 held together by bolts 22 and forming an interior cylindrical chamber 23 which is provided with inlet and outlet ports 24 and 25, respectively, for the passage of the suspension of fibrous material in the treating liquid. Extending through the casing and the cylindrical chamber at right angles to the flow of liquid suspension is a shaft 26 driven by any suitable means, as by a belt and pulley, or by an electric motor, either directly or through a speed reducer. Shaft 26 enters the casing 21 through the stuffing boxes 28, which prevent any leakage of the treating liquid from the valve. Carried on this shaft 26 within the cylindrical chamber 23 is a rotor 27 provided with vanes 29 of such length that the rotor and the vanes make a running fit with the walls of the cylindrical chamber. The rotor and vanes may be made of any metal which is resistant to the action of the liquid used for the treatment of the fibrous material. The leading edges 30 of the vanes 29 and the corresponding edges 31 of the chamber wall are made sufficiently sharp and the vanes have sufficient strength to shear any fibrous material which may be caught between them during the operation of the valve. Four vanes are shown in the drawings, but a smaller or greater number may be provided; it being only essential that the vanes be of sufficient number and be so located about the rotor that there is never a direct connection between ports 24 and 25.

In operation, a suspension of, for example, cotton linters in aqueous caustic soda solution will be prepared in the mixer 1 and circulated by means of centrifugal pumps 2 through the coil 3. In the steam-jacketed portion of the coil, the temperature of the suspension will be raised to any desired value with a corresponding increase in pressure; it being only necessary to maintain the pressure developed by heating the suspension below that which the centrifugal pumps can develop, so that no backward flow of material can result. The speed of passage of the suspension through the coil 3 is determined by the length of time desired for the treatment, which is in turn a factor of the temperature and pressure employed. The treated suspension, after being cooled by passage through the water jacketed portions of the coil, in order to reduce the pressure to some extent, is discharged through the rotary release valve 14. The rotational speed of this valve may be adjusted at all times to correspond with the speed at which the suspension is passing through the coil.

In operation of the release valve, the suspension under pressure enters through port 24 and immediately fills the space between two vanes 29 of the rotor. This portion of the material is then entrapped by the vanes of the rotor as it rotates until it comes into alignment with the discharge port 25 of the valve through which it is discharged. Any fibrous material which might tend to clog the operation of the rotor by jamming between the vanes and the wall of the chamber is severed by the joint action of the sharp edges 30 and 31 of the vane and chamber wall, respectively. It will be seen that at no time can a direct passageway exist between ports 24 and 25 and that accordingly the pressure in the treating coil is effectively maintained, while the suspension, after passing through the discharge valve, is discharged against atmospheric pressure.

While the operation of the discharge valve in accordance with this invention has been described with reference to a treating process in which the suspension of fibrous material is under pressure, it will be understood that the discharge valve will function effectively and in the same manner when operating on a suspension at atmospheric pressure.

What I claim and desire to protect by Letters Patent is:

1. In apparatus for the continuous treatment of fibrous material comprising a treating chamber and means for passing a liquid suspension of fibrous material through said chamber; means for regulating the discharge of said suspension of fibrous material from said chamber, said means comprising a valve chamber having inlet and outlet ports and means positioned in said chamber preventing at all times direct communication between said ports, said means comprising a rotor and vanes mounted thereon to give a running fit with the walls of said valve chamber and being adapted upon rotation to permit portions of said suspension entrapped between said vanes to pass from the inlet port to the outlet port, the edges of said vanes and said valve chamber walls being adapted to sever any fibrous material caught between them during rotation.

2. In apparatus for the continuous treatment of fibrous material comprising a treating chamber and means for passing a liquid suspension of fibrous material through said chamber under pressure; means for regulating the discharge of said suspension of fibrous material from said chamber, said means comprising a valve chamber having inlet and outlet ports and means positioned in said chamber preventing at all times direct communication between said ports, said means being rotatable to permit portions of said suspension to pass from the inlet port to the outlet port and adapted to sever any fibrous material caught between said means and an edge of the inlet port.

3. In apparatus for the continuous treatment of fibrous material comprising a treating chamber and means for passing a liquid suspension of fibrous material through said chamber; means for regulating the discharge of said suspension of fibrous material from said chamber, said means comprising a valve chamber having inlet and outlet ports and means positioned in said chamber preventing at all times direct communication between said ports, said means comprising a rotor and vanes mounted thereon to give a running fit with the walls of said valve chamber and being adapted upon rotation to permit portions of said suspension entrapped between said vanes to pass from the inlet port to the outlet port, the leading edges of the vanes and an edge of the inlet port being so formed that in passage of a vane by the port any fibrous material caught between said edges will be severed.

4. In apparatus for the continuous treatment of fibrous material comprising a treating chamber and means for passing a liquid suspension of fibrous material through said chamber; means for regulating the discharge of said suspension of fibrous material from said chamber, said means comprising a valve chamber having inlet and outlet ports and means positioned in said chamber preventing at all times direct communication between said ports, said means being rotatable to permit portions of said suspension to pass from the inlet port to the outlet port and adapted to sever any fibrous material caught between said means and an edge of the inlet port.

LUKE H. SPERRY.